United States Patent [19]

Izukawa et al.

[11] Patent Number: 4,657,360
[45] Date of Patent: Apr. 14, 1987

[54] OPTICAL SYSTEM FOR MAKING AN ANNULAR BEAM

[75] Inventors: Kazuhiro Izukawa; Ichiro Okumura, both of Yokohama, Japan

[73] Assignee: Canon Kabushiki Kaisha, Tokyo, Japan

[21] Appl. No.: 697,457

[22] Filed: Feb. 1, 1985

[30] Foreign Application Priority Data

Feb. 10, 1984 [JP] Japan .................................. 59-21932

[51] Int. Cl.$^4$ .................... G02B 17/06; G02B 7/18; G02B 5/10
[52] U.S. Cl. ..................................... 350/620; 350/631
[58] Field of Search ............... 350/442, 443, 620, 619, 350/505, 504, 525, 631

[56] References Cited

U.S. PATENT DOCUMENTS 2,891,437   6/1959   Tripp ..................................... 350/620

*Primary Examiner*—Jon W. Henry
*Attorney, Agent, or Firm*—Fitzpatrick, Cella, Harper & Scinto

[57] ABSTRACT

An optical system for making an annular beam comprises a first member supporting a convex reflecting surface for reflecting an incident beam and having a first tapered surface, and a second member having a second tapered surface bearing against the first tapered surface and supporting a concave reflecting surface in a predetermined positional relation relative to the convex reflecting surface so as to reflect the beam reflected by the convex reflecting surface and make it into an annular beam.

4 Claims, 9 Drawing Figures

4,657,360

OPTICAL SYSTEM FOR MAKING AN ANNULAR BEAM

BACKGROUND OF THE INVENTION

1. Field of the Invention

This invention relates to an optical system for making an annular beam, and more particularly to an optical system for making an annular beam which is suitable for use in the optical head of an optical information recording-reproducing apparatus such as an optical disc apparatus.

2. Description of the Prior Art

Heretofore, in the optical head or the like of an optical information recording-reproducing apparatus, it has been desired to condense a light beam into a spot of as small a diameter as possible in order to make the recording density in the recording medium great. Therefore, it has been necessary to use a lens of a great numerical aperture (herein after referred to as N.A.). On the other hand, the lens for such an optical head must be sufficiently aberration-corrected. However, if N.A. is made great a number of lenses become necessary for the correction of aberrations, and this had led to a problem that the weight of the optical head is increased.

So, a method of providing a light-intercepting plate on the central portion of the lens and using only the marginal portion of the lens is proposed in Japanese Laid-open Patent Application No. 116004/1981. However, in this method, part of the light energy emitted from a light source is intercepted, thus resulting in a reduction in the output on the medium. Therefore, instead of the light-intercepting plate, the advent of simple means whereby an annular beam can be obtained without losing energy has been desired.

SUMMARY OF THE INVENTION

It is an object of the present invention to provide an optical system for making an annular beam by which an annular beam can be obtained without losing energy and which can be assembled easily and with high accuracy.

The above object of the present invention is achieved by an optical system for making an annular beam which comprises a first member supporting a convex reflecting surface for reflecting an incident beam and having a first tapered surface, and a second member having a second tapered surface bearing against said first tapered surface and supporting a concave reflecting surface in a predetermined positional relation relative to said convex reflecting surface so as to reflect the beam reflected by said convex reflecting surface and make it into an annular beam.

DESCRIPTION OF THE PREFERRED EMBODIMENTS

Figure 1:
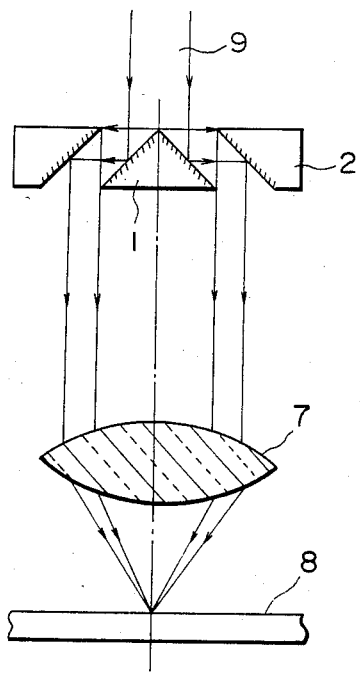
FIG. 1 is a schematic cross-sectional view showing an example of the optical head using an optical system for making an annular parallel beam by a combination of two concave and convex conical mirrors.

FIG. 1 is a schematic cross-sectional view showing an example in which the optical system of the present invention is applied to the optical head of an optical information recording-reproducing apparatus. The incident beam 9 from a light source, not shown, is made into an annular beam by a combination of a convex conical mirror 1 and a concave conical mirror 2, as shown, and this beam is condensed on an information recording medium 8 by an objective lens 7. According to such a construction, an effect similar to the effect of intercepting light in the central portion is obtained without losing energy and only the marginal portion of the objective lens 7 is used, and this is advantageous for the correction of aberrations.

Now, in the optical system as described above, the convex conical mirror 1 and the concave conical mirror 2 must be highly accurately disposed and fixed in a predetermined positional relation. For example, the positional deviation and angular deviation of the rotational symmetry axes of the two mirrors must be held down to the order of $\lambda/10$, where $\lambda$ is the wavelength of the incident beam. If an attempt is made to effect such position adjustment by the use of a measuring device such as an interferometer, cumbersome operation will be required and production efficiency will be reduced. Therefore, in the present invention, a tapered surface for assembly is provided on each of said mirrors or the support member therefor to thereby greatly simplify the position adjustment. A specific construction of the optical system of the present invention will hereinafter be described.

Figure 2:
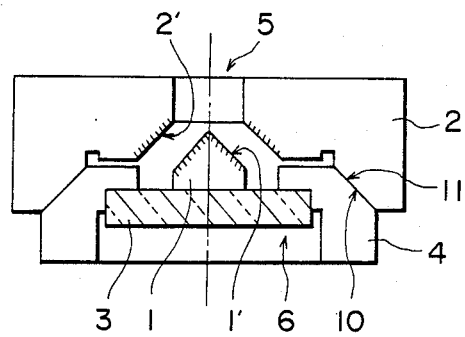
FIGS. 2 to 6 are cross-sectional views showing embodiments of the optical system of the present invention.

FIG. 2 is a cross-sectional view showing an embodiment of the present invention. In FIG. 2, reference numeral 1 designates a convex conical mirror having a conical convex reflecting surface 1'. Reference numeral 2 denotes a concave conical mirror having the same vertical angle as that of the mirror 1 and having a frustoconical concave reflecting surface 2' forming a part of the cone. A tapered surface 10 for assembly having the same rotation symmetry axis as that of the reflecting surface 2' is provided in the mirror 2. Reference numeral 3 designates a transparent glass plate to which the convex conical mirror 1 is fixed. The transparent glass plate 3 is mounted on a mirror support member 4. The mirror support member 4 is also provided with a tapered surface 11 for assembly having the same rotation symmetry axis as that of the reflecting surface 1' of the mirror 1, and the tapered surface 11 is in contact with and fixed to the tapered surface 10 of the concave conical mirror 2. Reference numeral 5 designates an entrance port for directing the incident beam to the reflecting surface 1' and reference numeral 6 denotes an exit port from which the annular beam reflected by the reflecting surface 2' emerges. The conical mirrors 1 and 2 may be made by cutting a metal such as aluminum or copper by means of a diamond cutter (a reflecting film can be suitably imparted to each of the thus made mirrors). The convex conical mirror 1, the glass plate 3 and the support member 4 are adhesively secured to one another in advance, and the reflecting surface 1' of the convex conical mirror 1 and the tapered surface 11 for assembly of the support member 4 are cut in the same process. Accordingly, the degrees of coaxiality of these two surfaces are guaranteed very well. For example, in a cutting tool using a static pressure air bearing in the rotational spindle thereof, the degree of coaxiality is 0.01 μm or less. Likewise, the reflecting surface 2′ of the concave conical mirror 2 and the tapered surface 10 for assembly are cut on the same process. By placing the tapered surfaces 10 and 11 of the support member 4 and the concave conical mirror 2, respectively, opposite each other and fixing them together after such working, the reflecting surfaces 1′ and 2′ can be accurately assembled together without effecting any cumbersome position adjustment and without causing any axial deviation and angular deviation. The beam having entered through the entrance port 5 is reflected by the reflecting surface 1′ whereafter it is reflected by the reflecting surface 2′ and becomes an annular paralell beam and emerges from the exit port 6.

Figure 3:
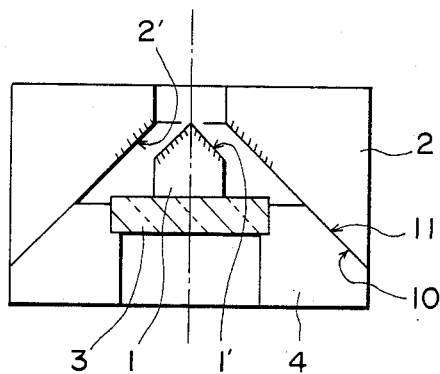
Figure 4:
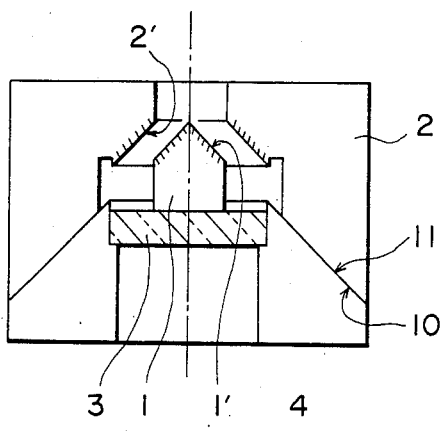

FIGS. 3 and 4 are cross-sectional views showing further embodiments of the present invention. In these Figures, members identical to those of FIG. 2 are given common reference numerals. In the embodiment of FIG. 3, the step difference is eliminated between the reflecting surface 2′ of the concave conical mirror 2 and the tapered surface 10 for assembly. Thereby, the cutting step during the making of the concave conical mirror 2 can be simplified. Likewise, in the embodiment of FIG. 4, the step difference between the reflecting surface 1′ of the convex conical mirror 1 and the tapered surface 11 for assembly is eliminated, whereby the cutting step during the making of the convex conical mirror 1 can be simplified.

Figure 5:
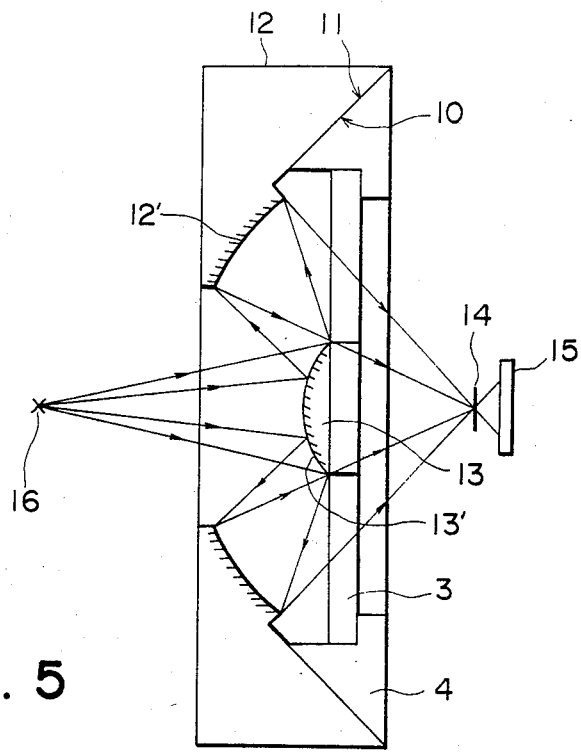
Figure 6:
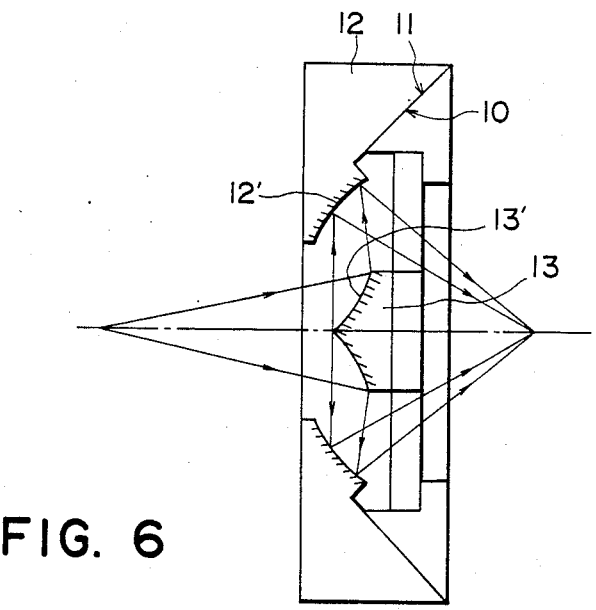

FIGS. 5 and 6 are schematic views showing embodiments in which the optical system of the present invention is applied to an X-ray microscope. In FIGS. 5 and 6, members identical to those of FIG. 2 are given common reference numerals. In FIG. 5, the beam from an X-ray source 16 is made into an annular beam by a convex reflecting surface 13′ and a concave reflecting surface 12′ formed into curved surfaces which create a concave lens action and a convex lens action respectively, and reduction-projects the image of the X-ray source 16 onto an object 14 to be examined. The object 14 to be examined is scanned by this X-ray beam, and the variation in quantity of the transmitted X-ray is detected by a photodetector 15 and the shape of the object to be examined is observed. Again in this case, assembly of a concave mirror 12 and a convex mirror 13 having the reflecting surfaces 12′ and 13′, respectively, affects the resolving power of the microscope and therefore, high assembly accuracy is required. Accordingly, as in the case of FIG. 2, by working tapered surfaces 11 and 10 having the same rotation symmetry axes as those of the reflecting surfaces 12′ and 13′ on the support member 4 for the concave mirror 12 and the convex mirror 13 simultaneously with the reflecting surfaces 12′ and 13′, and making these tapered surfaces bear against each other and assembling them together, highly accurate assembly can be accomplished easily. FIG. 6 shows a modification of the optical system of FIG. 5 which exhibits an entirely similar action.

Figure 7A:
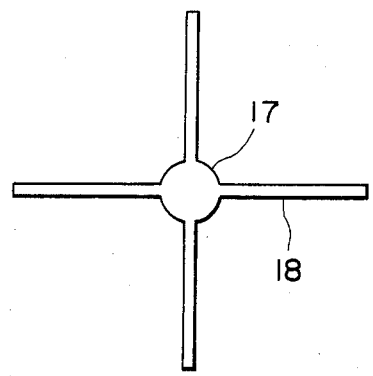
FIGS. 7A to 7C show examples of the construction of the support member for convex reflecting surface.
Figure 7B:
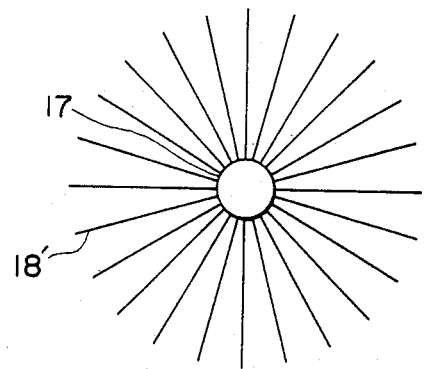
Figure 7C:
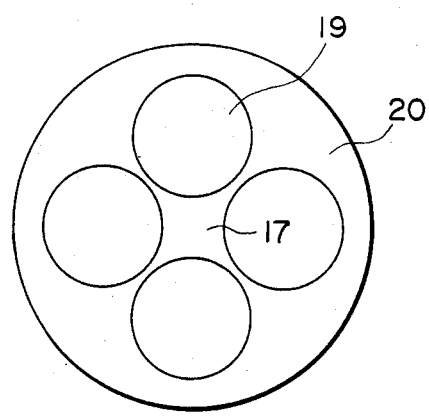

In the above-described embodiments, the convex mirror is supported by a material such as a transparent glass plate which transmits the beam therethrough and from the support member, but alternatively, as shown in FIG. 7A or 7B, a convex mirror mounting portion 17 may be supported by struts 18 or 18′ and from a support member, not shown. Also as shown in FIG. 7C, the convex mirror mounting portion 17 may be provided on a plate-like member 20 formed with aperture 19 for transmitting part of the annular beam therethrough. Further, the present invention is not restricted to these embodiments, but other various applications thereof are possible.

We claim:

1. An optical system for making an annular beam, comprising:
   a first member supporting a convex reflecting surface for reflecting an incident beam and having a first tapered surface; and
   a second member having a second tapered surface bearing against said first tapered surface and supporting a concave reflecting surface in an opposed relation relative to said convex reflecting surface so as to reflect the beam reflected by said convex reflecting surface and make it into an annular beam.

2. An optical system according to claim 1, wherein said convex reflecting surface and said first tapered surface form different portions of the same conical shape.

3. An optical system according to claim 1, wherein said concave reflecting surface and said second tapered surface form different portions of the same conical shape.

4. An optical system according to claim 1, wherein each of said first and second tapered surfaces has at least a part of conical shape.

* * * * *